United States Patent
Seagle

[11] Patent Number: 5,875,080
[45] Date of Patent: Feb. 23, 1999

[54] WRITE HEAD WITH SECOND COIL ABOVE POLE HAVING COIL DENSITY LESS ELECTRICALLY CONNECTED FIRST COIL BELOW THE POLE

[75] Inventor: David John Seagle, Morgan Hill, Calif.

[73] Assignee: International Business Machines Corporation, Armonk, N.Y.

[21] Appl. No.: 924,224

[22] Filed: Sep. 5, 1997

[51] Int. Cl.[6] .................................................. G11B 5/17
[52] U.S. Cl. ...................................... 360/123; 29/603.24
[58] Field of Search ..................................... 360/123, 124; 29/603.23, 603.24, 603.25, 603.26

[56] References Cited

U.S. PATENT DOCUMENTS

| | | | |
|---|---|---|---|
| 4,652,956 | 3/1987 | Schewe | 360/123 |
| 4,672,493 | 6/1987 | Schewe | 360/125 |
| 4,694,368 | 9/1987 | Bischoff et al. | 360/126 |
| 4,713,711 | 12/1987 | Jones, Jr et al. | 360/123 |
| 4,899,434 | 2/1990 | Roberts | 360/129 |
| 5,075,956 | 12/1991 | Das | 360/124 |
| 5,170,302 | 12/1992 | Matsumoto | 360/123 |
| 5,173,826 | 12/1992 | Bischoff | 360/126 |
| 5,241,440 | 8/1993 | Ashida et al. | 360/126 |
| 5,331,495 | 7/1994 | Yoshida et al. | 360/125 |
| 5,406,695 | 4/1995 | Amemori | 360/122 |
| 5,461,528 | 10/1995 | Keel | 360/124 |
| 5,471,354 | 11/1995 | Bortins et al. | 360/124 |

*Primary Examiner*—Craig A. Renner
*Attorney, Agent, or Firm*—Gary Cary Ware Freidenrich

[57] ABSTRACT

A low inductance magnetic write head is provided with first and second pole piece layers that have first ends separated by a write gap layer and second ends connected together at a back gap. An insulation stack is provided which is sandwiched between the first and second pole piece layers. A write coil layer and a second coil layer are provided wherein each coil layer has inner and outer ends. The coil layers wind in the same direction from their inner ends to their outer ends. Each of the coil layers has first and second layer portions. The first layer portion of the write coil layer is embedded in the insulation stack. The second pole piece layer is sandwiched between the first portion of the write coil and a non-magnetic layer and the first non-magnetic layer is sandwiched between the second pole piece layer and the first portion of the second coil layer. The inner ends of the coil layers are electrically connected and the outer ends of the coil layers are electrically connected to a write current source so that when the write current source is introduced write fluxes from the coil layers are in opposition. The first layer portion of the second coil layer has a turn density that is less than a turn density of the first layer portion of the write coil layer.

60 Claims, 9 Drawing Sheets

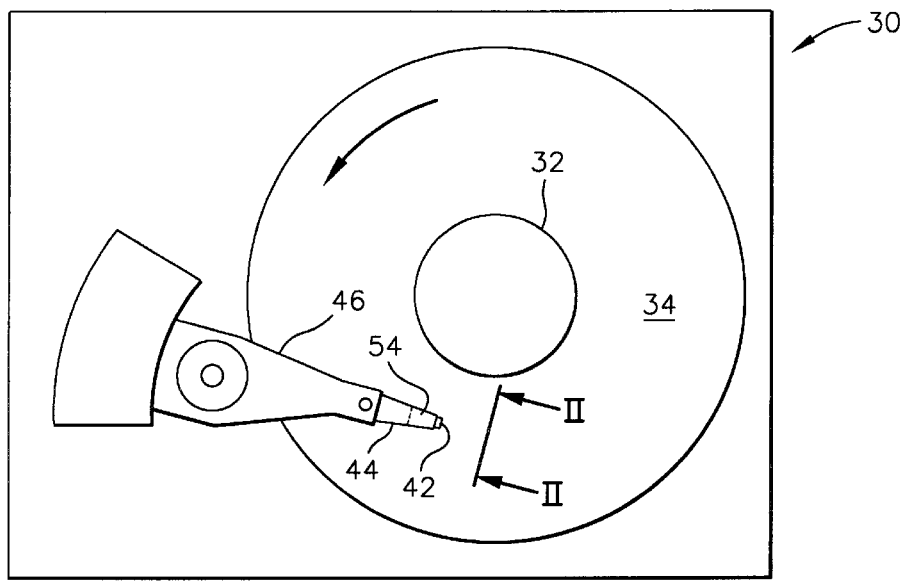
FIG. 1
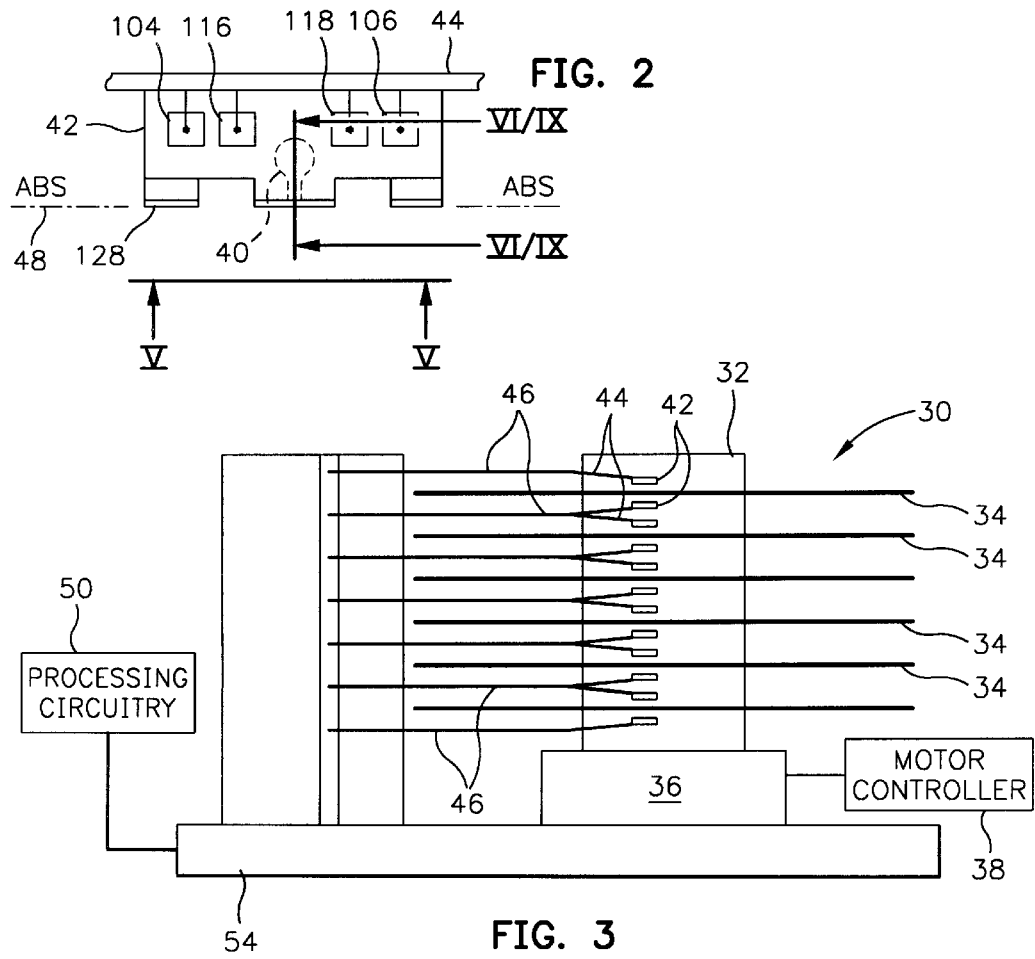
FIG. 2
FIG. 3

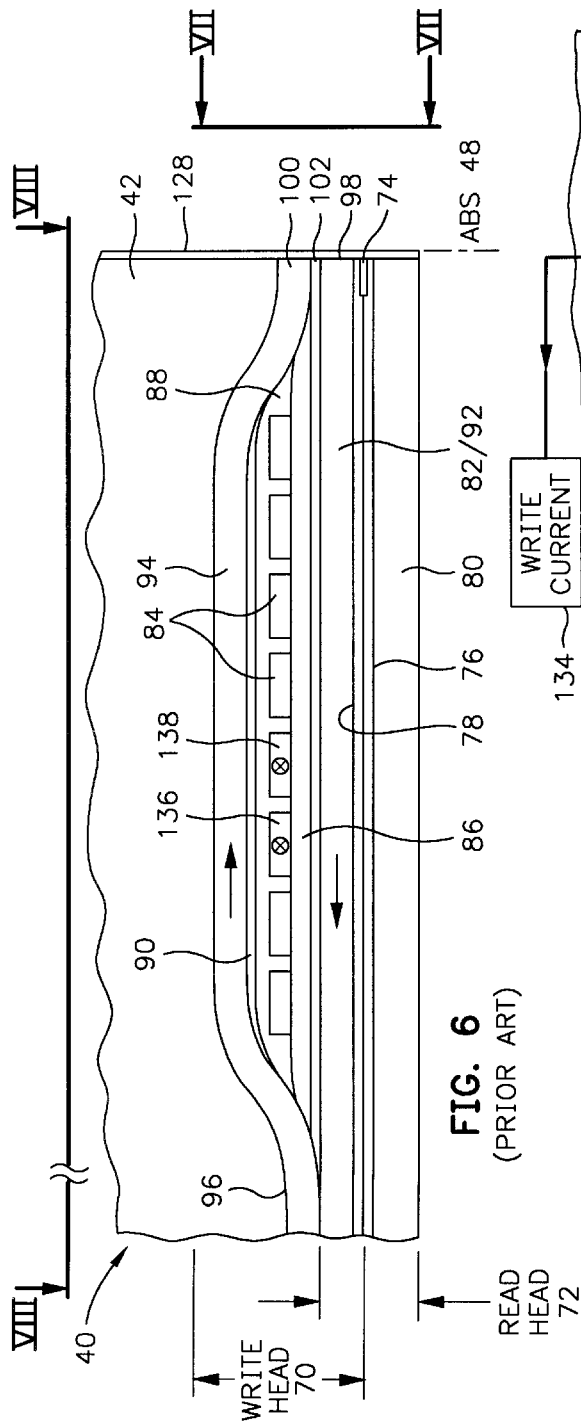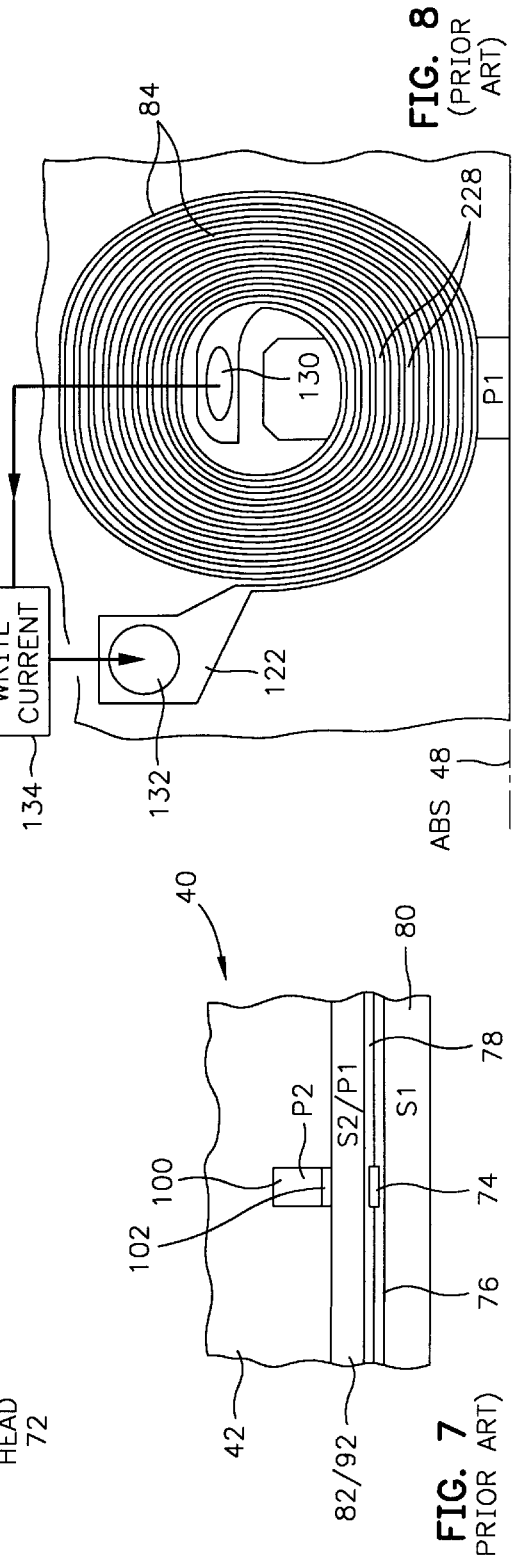
FIG. 6 (PRIOR ART)
FIG. 7 (PRIOR ART)
FIG. 8 (PRIOR ART)

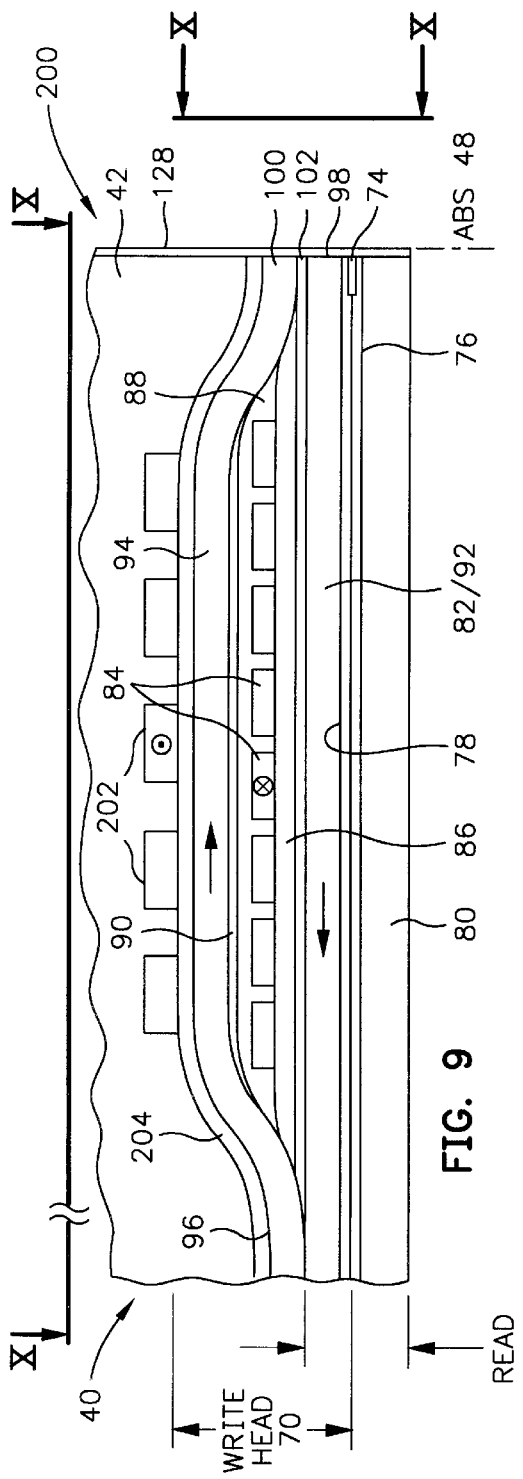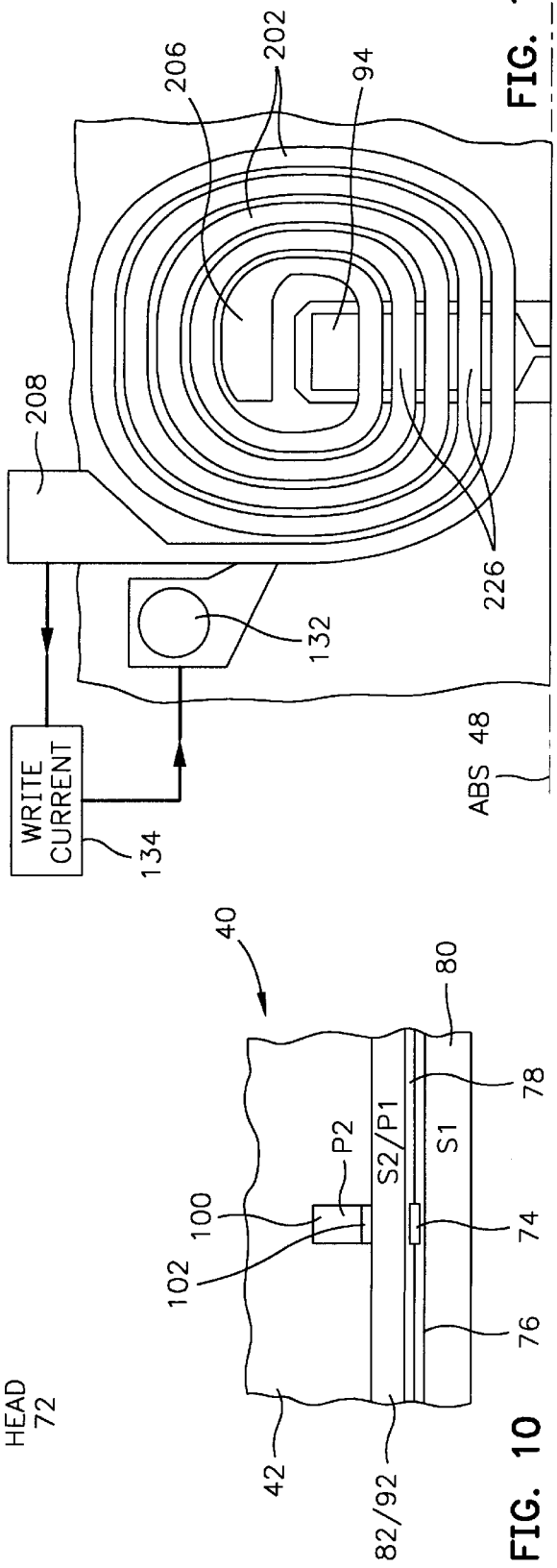
FIG. 9
FIG. 10
FIG. 11

WRITE HEAD WITH SECOND COIL ABOVE POLE HAVING COIL DENSITY LESS ELECTRICALLY CONNECTED FIRST COIL BELOW THE POLE

BACKGROUND OF THE INVENTION

1. Field of the Invention

The present invention relates to a write head with counter current coil layers, and more particularly to a write head with first and second coil layers where the first coil layer is a write coil layer adjacent one side of a second pole piece layer and the second coil layer opposes the write coil layer on an opposite side of the second pole piece layer.

2. Description of the Related Art

A write head is typically combined with a magnetoresistive (MR) read head to form a merged MR head. A merged MR head may have thin film layers with edges that are exposed at an air bearing surface (ABS) for writing and receiving magnetic fields on a magnetic medium, such as a disk or tape drive. In a merged MR head, the write head comprises first and second pole piece layers connected at a back gap that is recessed from the ABS. Each of the first and second pole piece layers has a pole tip, a yoke and a back gap, with the yoke being located between the pole tip and the back gap. The pole tips, which may be referred to as first and second pole tips, terminate at the ABS. An insulation stack, which comprises a plurality of insulation layers, is sandwiched between the yoke portions of the first and second pole piece layers and a write coil layer is embedded in the insulation stack. A processing circuit is connected to the write coil layer for conducting a write current through the coil layer, which, in turn, induces magnetic flux in the first and second pole piece layers. A non-magnetic gap layer is sandwiched between the first and second pole tips so that magnetic flux in the first and second pole tips fringes across the gap layer at the ABS to create write fields.

In a magnetic disk drive a magnetic disk is rotated adjacent to and a short distance from the ABS so that the write fields magnetize the disk along circular tracks. The written circular tracks then contain magnetized segments with fields detectable by a read head.

An MR read head includes an MR sensor sandwiched between first and second non-magnetic gap layers and having an edge located at the ABS. The first and second gap layers and the MR sensor are sandwiched between first and second shield layers. In a merged MR head, the second shield layer and the first pole piece are a common layer. The MR sensor detects magnetic fields from the circular tracks of the rotating disk by a resistance change that corresponds to the strengths of the fields. A sense current conducted through the MR sensor results in voltage changes received by the processing circuitry as readback signals.

One or more merged MR heads may be employed in a magnetic disk drive for reading and writing information on circular tracks of a rotating disk. A merged MR head is mounted on a slider carried on a suspension. The suspension is mounted to an actuator which rotates the magnetic head to locations corresponding to desired tracks. As the disk rotates an air cushion is generated between the rotating disk and the ABS of the slider. A force of the air cushion against the ABS is opposed by an opposite loading force produced by the suspension, causing the magnetic head to be suspended a slight distance (flying height) from the surface of the disk. Flying heights are typically on the order of about 0.05 $\mu$m.

A high data rate is desirable for high performance write heads. Data is written by the write head as field signals into the rotating disk. A high data rate increases the density of information recorded on the rotating disk. In digital recording, the circuit supplying write current to the write head is required to switch at a high rate to produce positive and negative field signals. The quicker the switching, the higher the data rate. Unfortunately the write current circuit's inductance limits the data rate. Furthermore high inductance requires a higher write circuit voltage. This decreases battery life of portable computers, and requires a thick write head coil to dissipate heat. A thicker coil increases the height of the write head in the yoke region, which increases the aspect ratio of a photolithography photoresist step employed for patterning the second pole tip. The aspect ratio is the ratio between the thickness of the photoresist in the pole tip region and the track width of the second pole tip. High aspect ratios result in poorly formed second pole tips.

The write coil layer is designed to have a certain turn density, pitch, spacing between the coil turns, thickness and overall diameter. Turn density is the number of coil turns per width across the coil. Pitch is the distance from the beginning of one coil turn to the beginning of an adjacent coil turn, as measured across the width of the coil and thickness is the thickness of the coil layer. The pole piece layers function as a core with respect to the write coil since they conduct the flux generated by the write coil. Upon energizing the write coil with write current, each coil turn generates flux that encircles the turn. Between first and second adjacent turns, the first turn generates flux in one direction in the space between the turns and the second turn generates flux in an opposite direction in the space between the turns. Consequently, flux from adjacent turns is cancelled in the space between the turns. However, flux from the turns above and below the coil layer combines to travel in one of two directions about the write coil layer, depending upon the polarity of the write current. Accordingly, flux about the coil layer is induced into each of the first and second pole piece layers, thereby providing write fields at the write gap.

It should be understood that the first and second pole pieces contribute to the inductance of the write current circuit. The inductance of this ferromagnetic circuit is proportional to the amount of flux conducted through it. This inductance is necessary because the ferromagnetic circuit will not work without the pole piece layers. However, there is also a certain amount of flux beyond the first and second pole piece layers that returns through the coil. This flux, known as "coil flux", is typically modelled as a parasitic inductance of the ferromagnetic circuit. The magnitude of this parasitic inductance is related to the amount of flux that travels through ferromagnetic material, such as the first pole piece layer beyond the ferromagnetic circuit or the first shield layer of the read head below the first pole piece. The magnitude of this parasitic inductance is also related to the pitch or the diameter of the write coil. However, reduction of the pitch or diameter increases the difficulty of manufacturing the write coil. If this parasitic inductance could be reduced, the frequency response of the write circuit could be increased to increase the data rate, the magnitude of the write current could be decreased to conserve power and reduce heat, the thickness of the write coil could be decreased, while pitch or diameter of the coil could be increased to promote manufacturability, and the first shield layer and the first pole piece layer could be extended beyond the back gap region to promote planarity of the head.

SUMMARY OF THE INVENTION

I have investigated the employment of a second coil layer that is identical to the write coil for the purpose of reducing parasitic inductance. The yoke portion of the second pole piece layer is located between the write coil layer and the second coil layer, with each of the write coil layer and the second coil layer being separated from the second pole piece layer by a respective insulation layer. Accordingly, the second write coil layer is above the second pole piece layer in a position opposite the write coil layer. The second coil layer is wound in the same direction as the write coil layer. Each coil layer has an inner end located at a center of the coil and an outer end located at the outer periphery of the coil. The inner ends are connected together and the outer ends are adapted for receiving the write current. If the coil layers are viewed in plan the current can enter the outer end of the write coil and travel in the write coil clockwise, for instance, until it reaches the connection of the inner ends. The write current then travels in the second coil in a counterclockwise direction to the outer end of the second coil. The current flows in opposite angular directions in the coils. The pitch of the write coil is made as small as possible to reduce unwanted flux transfer between the first and second pole piece layers other than across the write gap and the back gap. Accordingly, the second coil also has a small pitch. This arrangement was investigated by standard electromagnetic modeling. The result was that the parasitic inductance was significantly reduced. The reason for this is because the directions of the fluxes of the first and second pole piece layers are opposite one another above and below the second coil layer. Accordingly, the fluxes at these locations oppose one another to significantly reduce the inductance. This is true even though a ferromagnetic layer, such as the first shield layer of the read head, is in the flux path.

While parasitic inductance is reduced with the scheme investigated, some problems remain. One is poor manufacturing yield. Because of the small pitch of the write coil, there is a limit on yield due to the difficulty of making the write coil with a photolithography photoresist step. In this regard, a photoresist layer is exposed to light where the photoresist is to be removed for plating the copper write coil. When the coil turns are close together the likelihood of improper exposure is increased, which reduces the yield. When the second coil is identical to the first, the manufacturing yield is impacted twice. Another serious problem is that the resistance to the write current has been doubled. This increases heat in the head, which increases risk that the magnetics of the read head will be altered when the head further heats up upon contacting an asperity on the magnetic disk.

I have found that a second coil with fewer turns and a greater thickness than the write coil will substantially overcome the problems of reduced manufacturing yield and increased resistance while still yielding a significant reduction in parasitic inductance. With fewer turns, the pitch can be increased, thereby making it easier to manufacture the second coil within acceptable tolerances. Furthermore, increasing the thickness of the second coil reduces its resistance. While the reduction in inductance is not as great as that achieved by an identical second coil, the reduction significantly overcomes the problems associated with a write coil without the second coil. As an example, if the second coil has half the number of turns as the write coil, but twice the thickness, the resistance of the write coil circuit will increase only 12.5%, while the parasitic inductance will be reduced by 75%. In a preferred embodiment, the second coil should have 40% to 70% of the number of turns as the write coil.

An object of the present invention is to provide a write head wherein the parasitic inductance of the write coil circuit is reduced without sacrificing manufacturing yield or substantially increasing resistance of the write coil circuit.

Another object is to minimize flux from an energized write coil that is not conducted through first and second pole pieces, without sacrificing manufacturing yield or increasing resistance of the write coil circuit.

A further object is to provide a write head wherein inductance of a write coil circuit, except inductance due to first and second pole pieces, is reduced without sacrificing desirable design factors of a write coil portion of the write coil circuit.

Still another object is to provide a method of making a write head wherein inductance of a write coil circuit, except inductance due to the first and second pole pieces, is reduced without sacrificing manufacturing yield and desirable design factors of a write coil portion of the write coil circuit.

Other objects and advantages of the invention will become apparent upon reading the following description taken together with the accompanying drawings.

BRIEF DESCRIPTION OF THE DRAWINGS

FIG. 1 is a planar view of an exemplary magnetic disk drive;

FIG. 2 is an end view of a slider with a magnetic head of the disk drive as seen in plane II—II of FIG. 1;

FIG. 3 is an elevation view of the magnetic disk drive wherein multiple disks and magnetic heads are employed;

FIG. 6 is a partial view of a prior art magnetic head and slider as seen in plane VI—VI of FIG. 2;

FIG. 7 is a partial ABS view of the prior art magnetic head and slider taken along plane VII—VII with a wear layer removed to show the read and write elements of the magnetic head;

FIG. 8 is a view taken along plane VIII—VIII of FIG. 6 with all material above the second pole piece removed and with a portion of the head back of the back gap shown to illustrate the complete write coil;

FIG. 9 is a partial view of the present magnetic head and slider as seen in plane IX—IX of FIG. 2;

FIG. 10 is a partial ABS view of the present magnetic head and slider taken along plane X—X with a wear layer removed to show the read and write elements of the magnetic head;

FIG. 11 is a view taken along plane XI—XI of FIG. 9 with all material above the second pole piece removed and with a portion of the head back of the back gap shown to illustrate a complete second coil;

DESCRIPTION OF THE PREFERRED EMBODIMENTS

Figure 4:
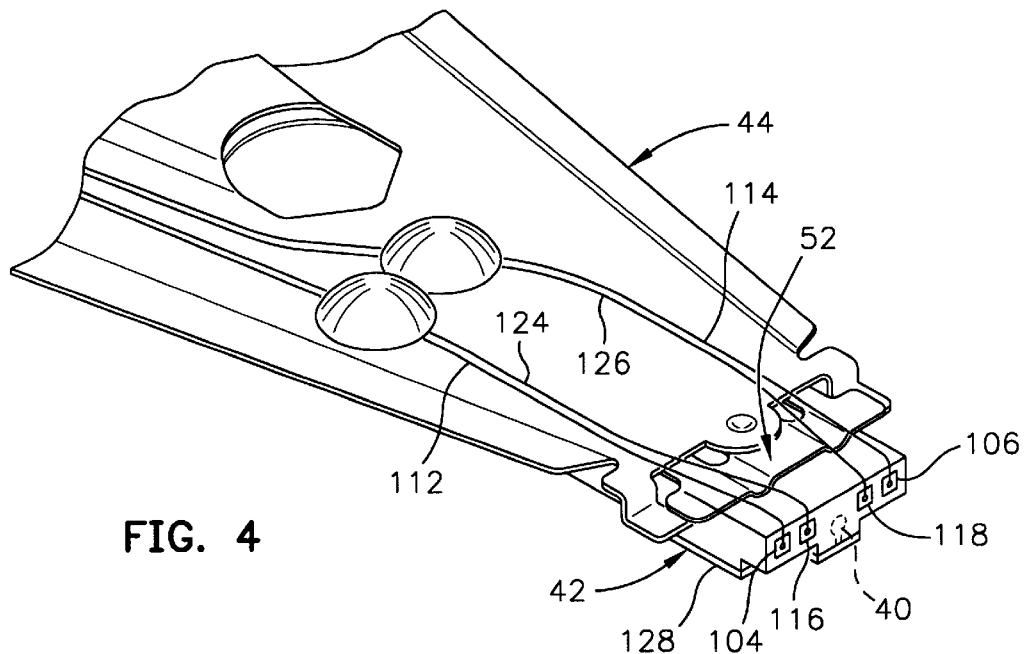
FIG. 4 is an isometric illustration of an exemplary suspension system for supporting the slider and magnetic head.

Referring now to the drawings, wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 move the slider 42 to position the magnetic head 40 in a transducing relationship with a surface of the magnetic disk 34. When the disk 34 is rotated by the motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals, and provides control signals for moving the slider to various tracks. In FIG. 4 the slider 42 is shown mounted to a head gimbal assembly (HGA) 52 which, in turn, is mounted to the suspension 44. The components described hereinabove may be mounted on a frame 54.

Figure 5:
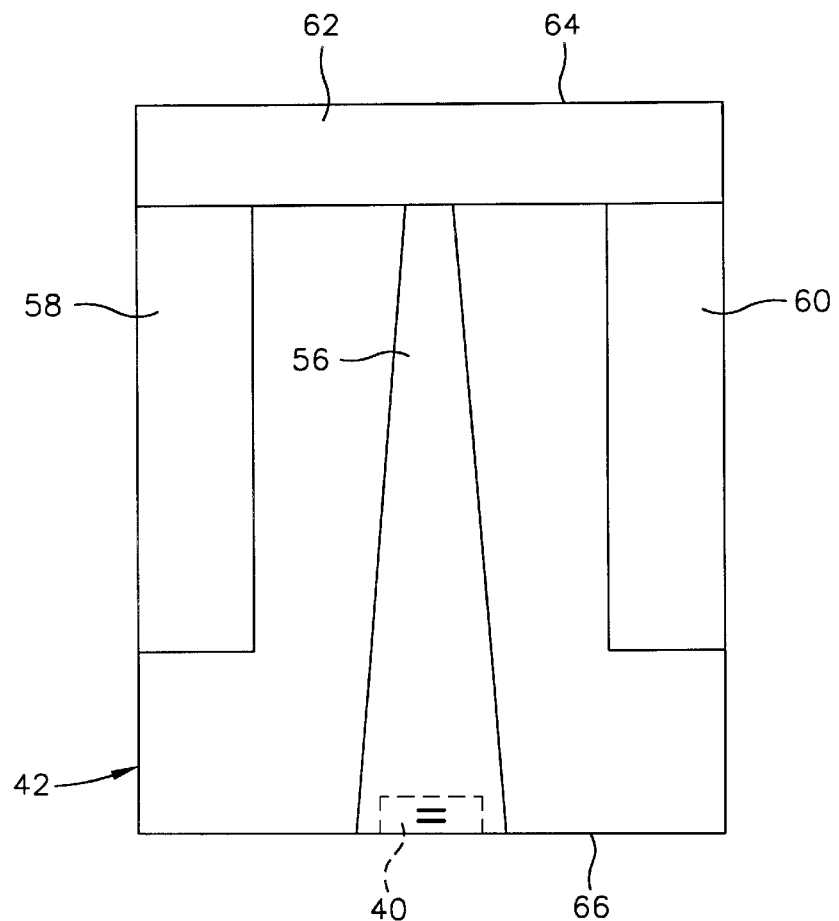
FIG. 5 is an ABS view of the slider and magnetic head taken along plane V—V of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a prior art combined magnetic head 40 which has a write head portion 70 and a read head portion 72, the read head portion employing an MR sensor 74. FIG. 7 is an ABS view of FIG. 6. The MR sensor 74 is sandwiched between first and second gap layers 76 and 78 and the gap layers are sandwiched between first and second shield layers 80 and 82. In response to external magnetic fields, the resistance of the MR sensor 74 changes. A sense current $I_S$ conducted through the sensor causes these resistance changes to be manifested as potential changes. These potential changes are then processed as readback signals by the processing circuitry 50 shown in FIG. 3.

The write head portion of the prior art head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads 108 and 110 (see FIGS. 9, 12 and 14) from the MR sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7.

The write coil 84 has inner and outer ends 130 and 132 that are connected to a write current source 134. The write current source 134 is part of the processing circuitry 50 shown in FIG. 3. The write current source 134 and the write coil 84 constitute a write coil circuit. The write coil 84 induces field signals into the first and second pole piece layers 92 and 94, shown in FIG. 6. The first and second pole piece layers 92 and 94, the write gap at 102 and the connection of the first and second pole piece layers at the back gap 96 constitute a ferromagnetic circuit. When the write current source 134 applies a write current in the direction of the arrows shown in FIG. 8, flux about the turns of the write coil are into the page, as shown by notations in a pair of adjacent coil turns 136 and 138 in FIG. 6, and the ferromagnetic circuit carries the flux in the direction of the arrows shown on the first and second pole pieces 92 and 94. An illustration of a transfer of this flux is shown in more detail in FIG. 15, which is an enlargement of the adjacent pair of coil turns 136 and 138 shown in FIG. 6.

Figure 15:
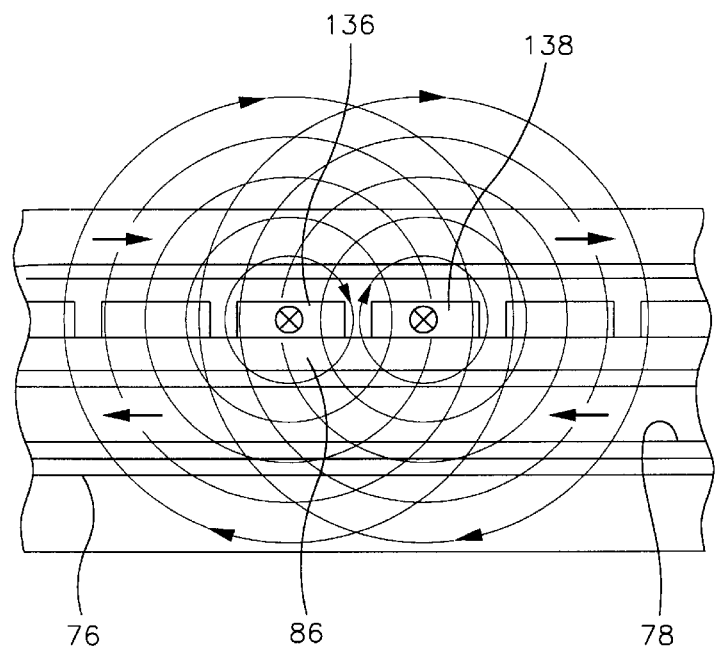
FIG. 15 is an enlarged portion of FIG. 6 with flux lines shown for a prior art pair of adjacent coil turns.

The flux lines for the pair of adjacent coil turns 136 and 138 are shown in FIG. 15. The flux lines are shown clockwise for each of the coil turns 136 and 138. It can be seen in the space between the coil turns 136 and 138 that the directions of the flux lines are in opposition, which causes a cancellation of the flux within that space. However, above and below the coil turns the flux lines combine to amplify the flux within the first and second pole pieces 92 and 94.

Figure 12:
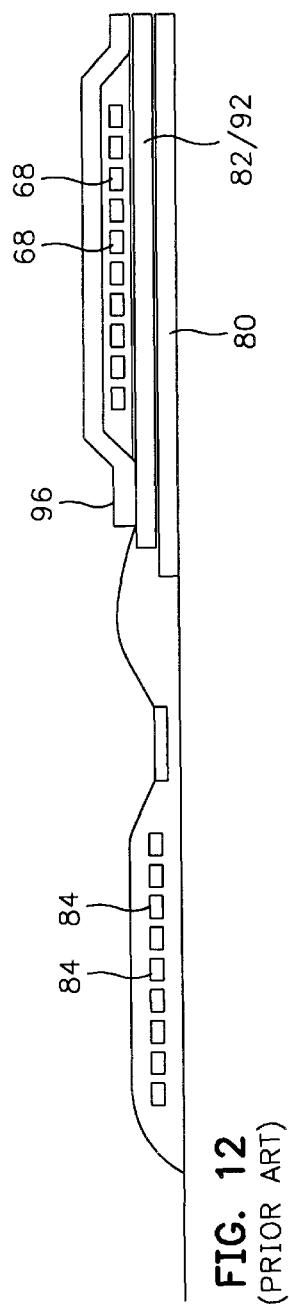
FIG. 12 is similar to FIG. 6 except a back portion of the write coil is illustrated.

The first and second pole pieces increase the inductance of the write coil circuit, as is necessary to the operation of the head. However, flux outside of the ferromagnetic circuit is modelled as parasitic inductance that is not necessary for the operation of the head. For example, the flux lines shown above the second pole piece layer 94 are in the insulation above the second pole piece layer, and the flux lines below the first pole piece layer 92 are in the first and second gap layers 76 and 78 and the first shield layer 80. The flux generated by the coil turns above and below, and laterally beyond, the first and second pole pieces is modelled as parasitic inductance that does not contribute to the operation of the head. The addition of a large ferromagnetic first shield layer introduces additional parasitic inductance by creating an image of the write coil in that layer and providing a path for flux in the air that passes through the center of the write coil. Manifestly, it would be desirable to reduce this parasitic inductance so as to improve the operation of the write coil circuit. FIG. 12 shows the back portion of the write coil without any ferromagnetic layers adjacent thereto, which minimizes inductance of the write coil circuit. It would be desirable if the first and second shield layers of the write head could be extended beyond the back gap 96 into the region where the back portion of the write coil is located so as to planarize the head.

Figure 16:
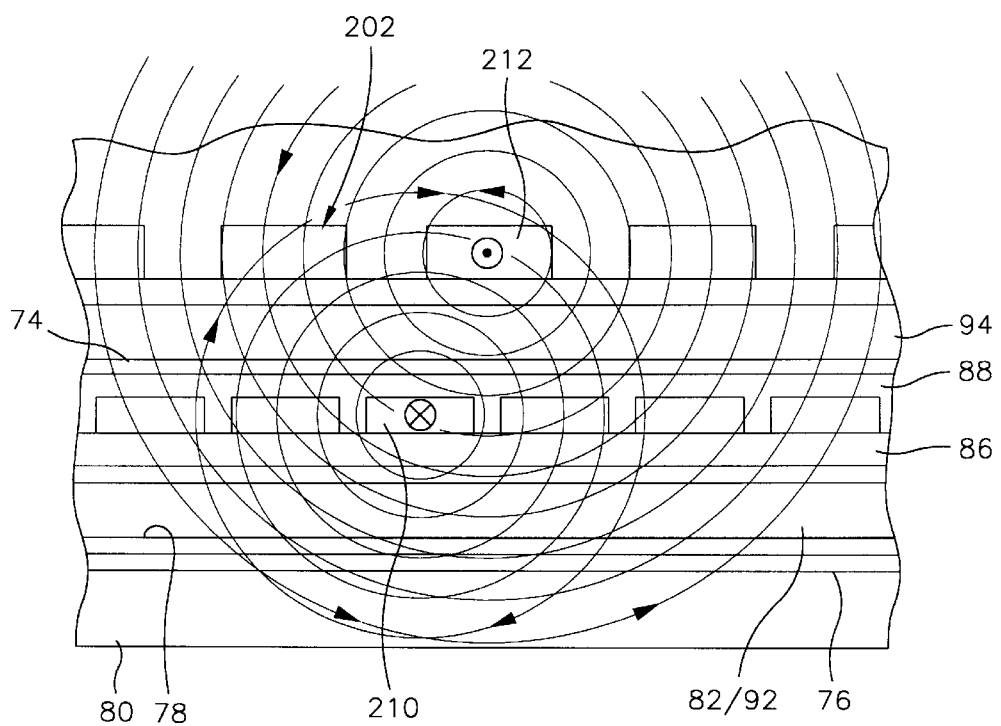
FIG. 16 is an enlarged portion of FIG. 9 showing flux lines for a coil turn from each of the present write coil and the present second coil.

The present magnetic head 200 is shown in FIGS. 9, 10, 11 and 13. This head minimizes the parasitic inductance of the prior art magnetic head shown in FIGS. 6, 7 and 8. The head shown in FIG. 9 is the same as the prior art head shown in FIG. 6 except I have provided a second coil layer 202 on top of the second pole piece layer 94 and that is separated therefrom by an insulation layer 204. The second coil 202 has fewer turns than the coil 84 for a purpose which will be described in more detail hereinafter. The second coil 202 has inner and outer ends 206 and 208. It should be noted that the write coil 84, as can be seen in plan in FIG. 7, and the second coil 202, which is shown in plan in FIG. 11, are wound in the same direction, namely clockwise from the inner ends to the outer ends. In FIG. 10 the write coil 84 of FIG. 8 is under the second coil 202 of FIG. 11. In the present head, shown in FIG. 10, the inner end 130 of the write coil 84 in FIG. 7 is connected to the inner end 206 of the second coil 202 in FIG. 11 and the outer ends 132 and 208 of the write coil 84 and second coil 202, respectively, are connected to the write current source 134. Accordingly, when the write current is directed, as shown by the arrows adjacent the write current source 134 in FIG. 11, the write current will enter the outer end 208 of the second coil and be conducted counter-clockwise to the inner ends 206 (see FIG. 11) and 130 (see FIG. 7) of the write coil and second coil, respectively, and thence be conducted through the write coil 84 in a clockwise direction to the outer end 132 of the write coil. Accordingly, the write coil circuit includes the write current source 134, the write coil 84 and the second coil 202. My investigation showed that the flux transfer between the coil turns of the write coil 84 and the pole pieces in FIG. 9 is the same as that shown in FIG. 6. The write coil 84 and the second coil 202 are connected in series. With the arrangement shown in FIG. 11, the write current is going into the page in the write coil 84 and coming out of the page in the second coil 202, as shown in FIG. 9. The flux generated by a pair of adjacent turns 210 and 212 in the write and second coils is shown in FIG. 16. While not preferred, it should be noted that the outer ends of the coils could be connected with current from the write current source applied to the inner ends of the coils.

Figure 13:
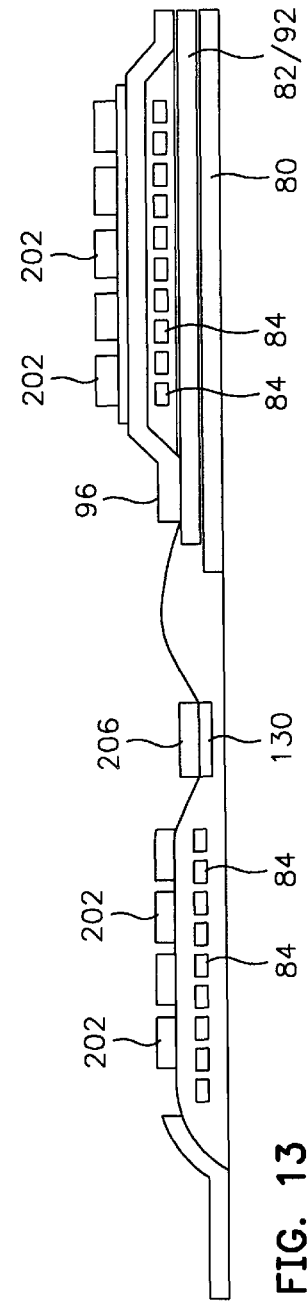
FIG. 13 is similar to FIG. 9 except a back portion of the write coil and second coil is shown.

As shown in FIG. 16, the flux generated by the current in the coil turn 210 of the write coil is in a clockwise direction and the flux generated by the current in the coil turn 212 of the second coil is in a counter-clockwise direction. It should be noted that the arrows in the flux lines of the write coil and the second coil are in opposition above the second coil and that the flux lines in the write coil and the second coil are in opposition below the first pole piece layer 92. Accordingly, the net flux above and below the ferromagnetic circuit is reduced, thereby reducing the parasitic inductance of the write coil circuit. It should be noted that the flux of the second coil 212 combines with the flux from the write coil to increase the flux density in the second pole piece while the flux from the second coil opposes the flux from the write coil in the first pole piece. The net result of this is that the amount of flux within the first and second pole pieces of the present invention is substantially the same as the amount of flux flowing in the first and second pole pieces of the prior art head shown in FIG. 6. As shown in FIG. 13, the first shield layer 80 and the first pole piece layer 92 have not been carried into the back region of the coil layers, however, the present invention now makes such a modification practical which will be discussed in more detail hereinafter.

Figure 14:
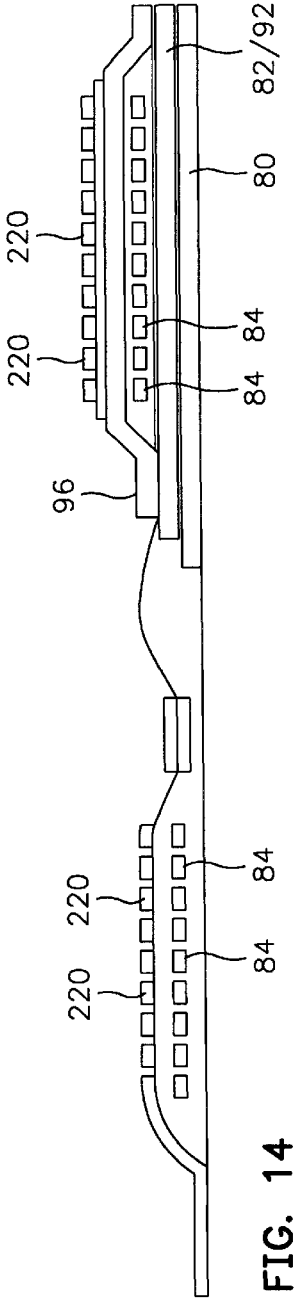
FIG. 14 is similar to FIG. 13 except the second coil is identical to the write coil.
Figure 17:
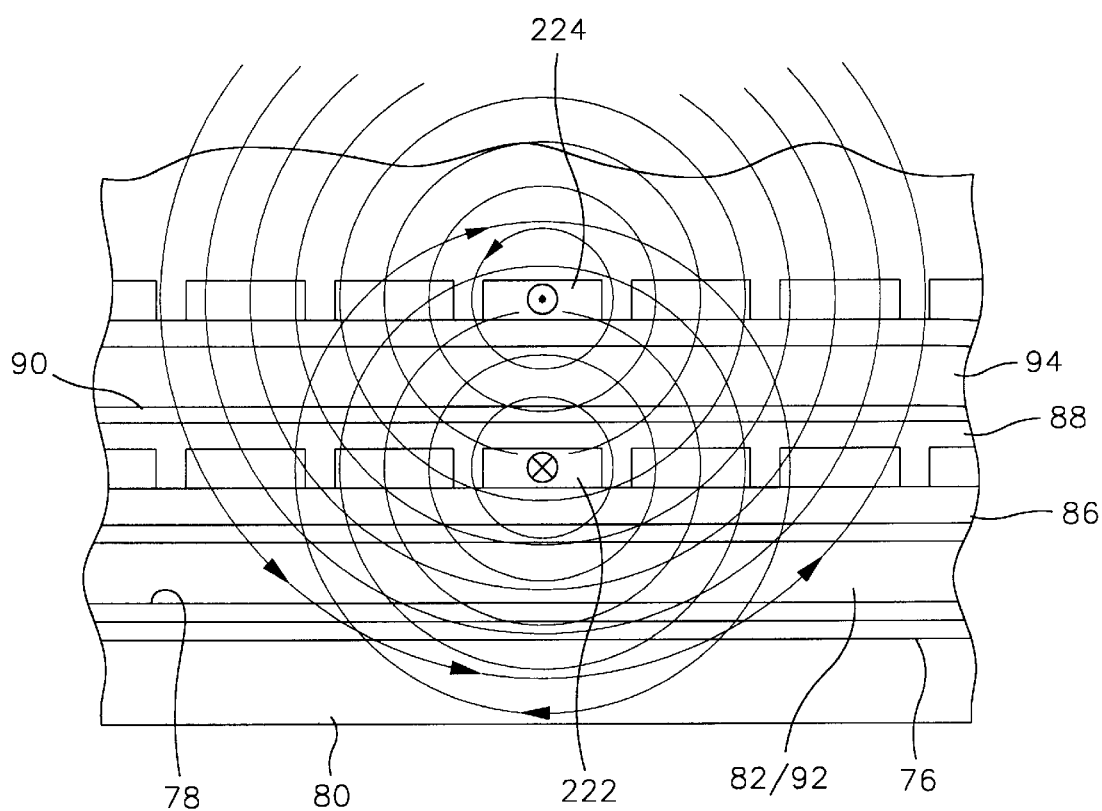
FIG. 17 is similar to FIG. 16 except the coil turns of the write coil and second coil are identical with respect to one another.

It should be noted from FIG. 9 that the spacing between the coil turns of the second coil 202 is greater than the spacing between the coil turns of the write coil 68. This can be accomplished because there are fewer turns in the second coil 202 than there are in the write coil 68. This is important in order to increase the manufacturing yield of the head shown in FIG. 9 It should be understood that the write coil 84 has a maximum number of turns with very little spacing between the coil turns in order to increase the write field at the gap. When fewer turns are employed, more write current is required to produce an equivalent write field at the medium. Manufacturing, yield is significantly impacted by the fact that the write coil is made by a photolithography photoresist step which relies upon light exposure of the photoresist layer and developing to provide an opening in the photoresist layer for plating the write coil. Because of the close spacing between the coil turns, the write coil is sometimes poorly formed and the partially completed heads on a wafer must be discarded. Unwanted particles and defects are also more likely to create shorts across turns of a write coil with a small pitch. If the second coil 202 is identical to the write coil 84 with the same number of turns and the same spacing between the coil turns, the manufacturing yield would be still further decreased. The present invention, as shown in FIG. 9, overcomes this problem. Further, if the second coil is identical to the write coil 68, the resistance of the write coil circuit is doubled. This would cause additional heating to the write head, which endangers the magnetics of the read head portion of the write head. In order to illustrate this point, an identical second coil 220 is located above the write coil 68, as shown in FIG. 14. The manufacturing yield loss will be doubled because of the identicality of the coils. Further, the resistance of the write coil circuit will be doubled. The flux lines for adjacent coils 222 and 224 of the write coil and the second coil, respectively, are shown in FIG. 17. It can be seen by the arrows above the second coil 224 and the arrows below the first pole piece layer 92 that the flux lines from these coil turns oppose one another. This will cause a greater decrease in the inductance of the write coil circuit than that produced by the present invention, shown in FIG. 16, because of the symmetry of the coil turns. However, I have found this arrangement to be impractical due to the aforementioned decrease in manufacturing yield and increase in resistance in the write coil circuit. The slightly higher inductance in the present invention over that shown in FIG. 17 warrants its implementation. For instance, when I employed half the number of turns for the second coil, as compared to the write coil, and doubled the thickness of the second coil, the resistance in the write coil circuit only increased by 12.5%. However, 75% of the parasitic inductance was eliminated. In my preferred embodiment the second coil has 40% to 70% of the number of coil turn portions traversing the second pole piece 94 per length of the second pole piece as that of the write coil. Accordingly, the number of coil turn portions 226 of the second coil traversing the second pole piece 94 per length of the second pole piece from its pole tip 98 to the back gap 80, shown in FIG. 11, is 40% to 70% of the number of coil turn portions 228 of the write coil traversing the second pole piece 94 per said length. It should be noted that the thickness or width of a coil turn has substantially no effect on the inductance of the write coil circuit.

Figure 18:
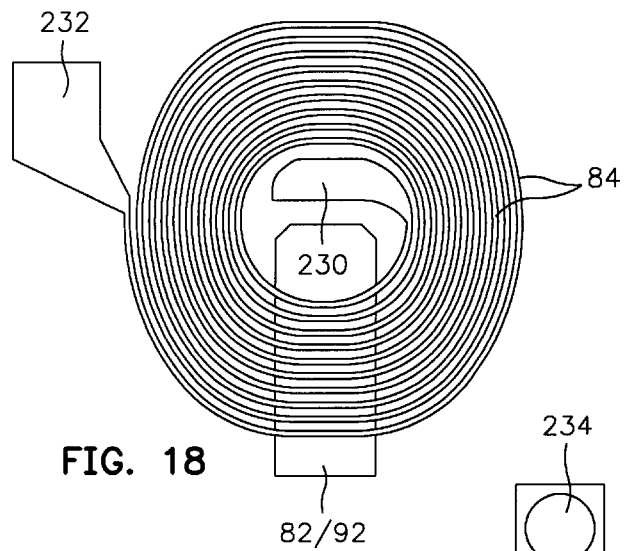
FIG. 18 is a plan view of an exemplary write coil of the present invention.
Figure 19:
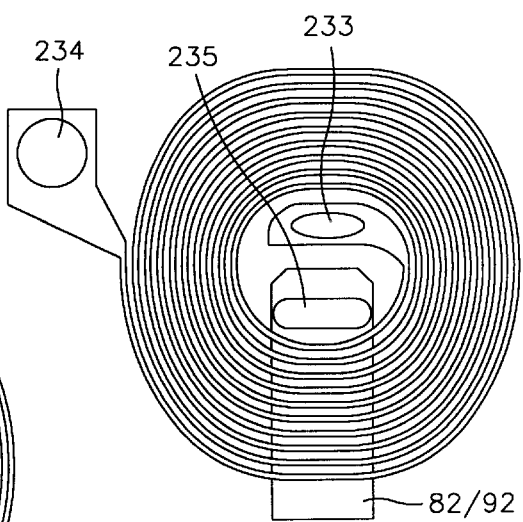
FIG. 19 is the same as FIG. 18 except vias have been made in the ends of the write coil and the back gap of the first pole piece.
Figure 20:
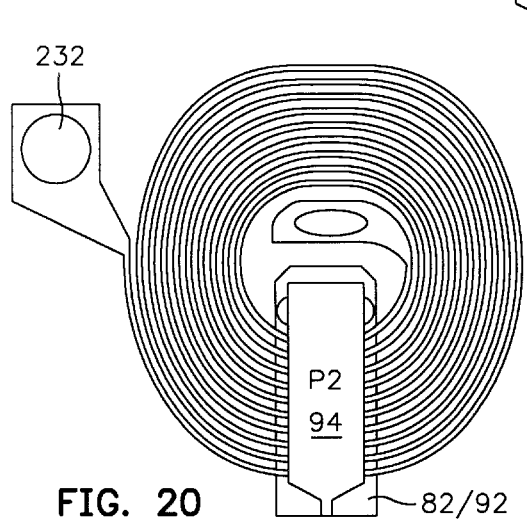
FIG. 20 is the same as FIG. 19 except the second pole piece has been formed.
Figure 21:
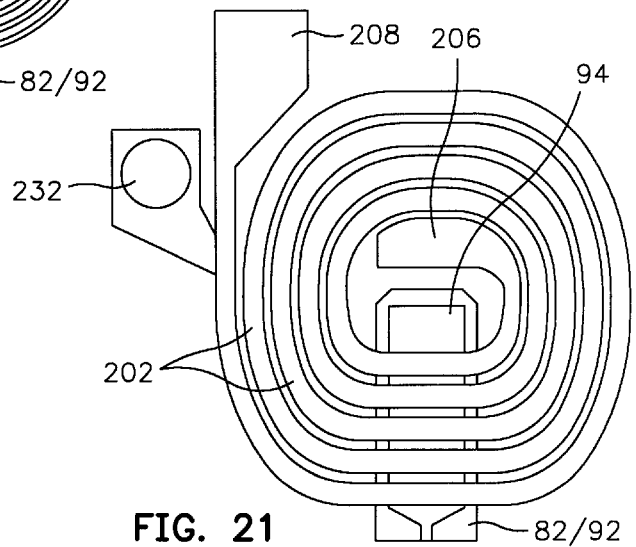
FIG. 21 is the same as FIG. 20 except the second coil has been formed on top of the write coil and the second pole piece.

FIGS. 9 and 18–21 illustrate a method for making the present invention. After formation of the first pole piece layer 92, an insulation layer 88 is formed on the first pole piece layer, followed by forming the write coil layer 84, as shown in FIGS. 9 and 18. The write coil layer 84 is formed by frame plating. Before the write coil layer 84 is formed a seedlayer (not shown) is sputtered on the first insulation layer 88. A photoresist layer is then spun on the seedlayer and exposed to light along where a spiral opening is to be created in the photoresist layer. The photoresist layer is subjected to a solution that removes the photoresist portion providing the spiral opening in the photoresist layer to the seedlayer where the coil layer is to be plated. Next, the coil layer is plated on the seedlayer and the photoresist is stripped by a dissolvent. Sputter etching is then employed to remove the seedlayer everywhere except under the coil turns. This series of steps is referred to in the art as "frame plating". The completed write coil layer has inner and outer ends 230 and 232. Next, insulation layers 88 and 90 are formed by spinning on layers of photoresist followed by hard baking of the layers at a high temperature. Next, vias 233 and 234 are formed in the inner and outer ends of the write coil layer and a via 235 is formed in the back gap region of the first pole piece layer 92, as shown in FIG. 19. Next, the second pole piece layer 94 is formed by frame plating, as shown in FIG. 20, which is the same process as that described for formation of the write coil layer 84. During this process, a back gap region of the second pole piece layer 94 is connected through the via 235 to a back gap region of the first pole piece layer 92. The insulation layer 204 is then formed on top of the second pole piece layer 94, as shown in FIG. 9. The second coil layer 202 is then formed by frame plating, as shown in FIG. 21. An overcoat layer (not shown) may then be formed on top of the second coil layer 202.

Figure 22:
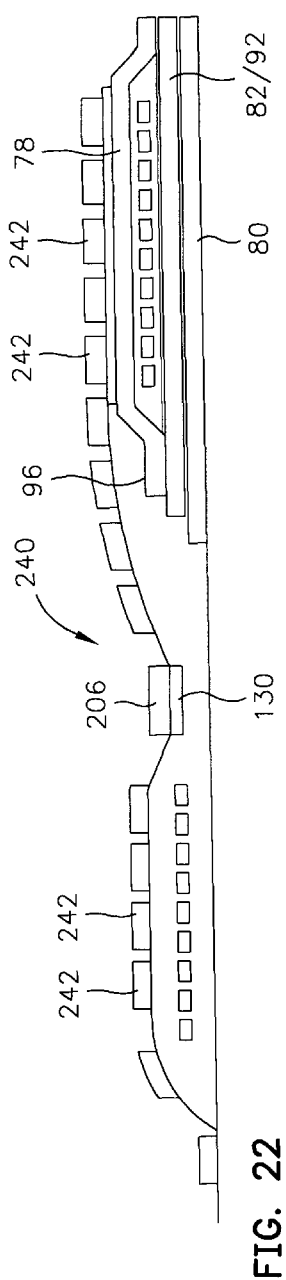
FIG. 22 is a longitudinal cross-section through another embodiment of the present invention.

Another embodiment 240 of the present head is shown in FIG. 22 wherein the front portion of the second coil 242 is also over the back gap 96. I have found this scheme to further reduce the inductance of the write coil circuit. This can also be employed for reducing the lithography in the front portion of the second coil. Since the back gap is covered by the front portion of the second coil, the pitch can be relaxed for the front portion of the second coil if desired. While the fields do not cancel perfectly in the short range, the inductance is substantially reduced. In the same manner, the pitch of the second coil in the back region behind the back gap can also be increased.

Figure 23:
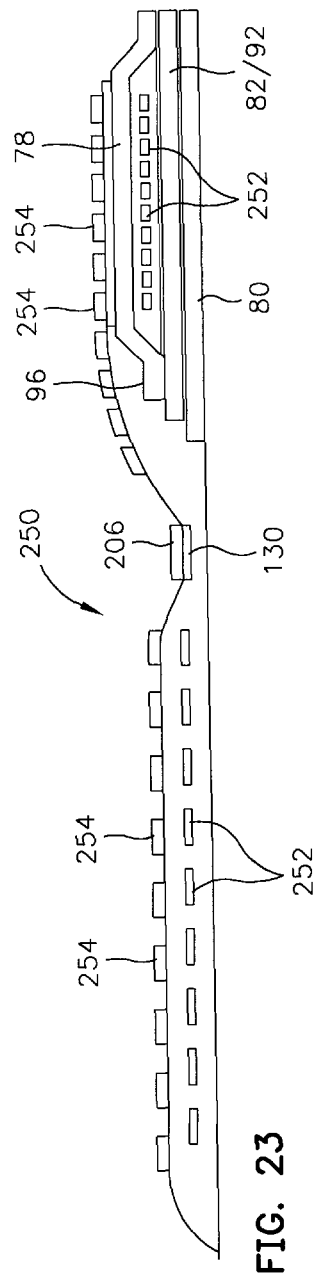
FIG. 23 is a longitudinal cross-section through a further embodiment of the present write head.

Another embodiment 250 of the head is illustrated in FIG. 23 wherein back portions, which are located back of the inner ends 130 and 206, of a write coil 252 and a second coil 254, have increased pitch as compared to the front portions of these coils. The front portion of the write coil 252 is required to have a small coil pitch in order to eliminate leakage between the first and second pole piece layers. Relaxing the coil pitch of the write coil in its back region will not impact this purpose. Accordingly, by increasing the coil pitch of both the write coil 252 and the second coil 254 in the back region will increase manufacturing yield because of the relaxed photolithography in that area without substantially increasing inductance even though the diameter of the write coil is larger.

Figure 24:
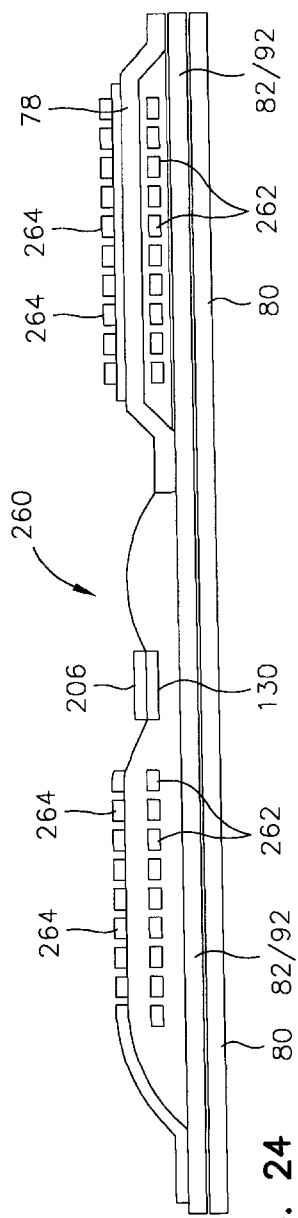
FIG. 24 is a longitudinal cross-section through still another embodiment of the present write head.

Still another embodiment 260 of the present invention is illustrated in FIG. 24. In this embodiment, the number of turns and pitch of the coils 262 and 264 are identical with the pitch remaining constant between the front portions and back portions relative to the inner ends 130 and 206. In this embodiment the first shield layer 80 and the first pole piece layer 92 are carried back into the back region so that the back portions of the write coil 262 and the second coil 264 are on top of the ferromagnetic layers. Without the second coil, the presence of these ferromagnetic layers in the back region would cause a significant increase in the inductance of the write coil. However, with the presence of the second coil, flux from the write coil in the back region is significantly cancelled by the flux of the second coil in the back region. The advantage of the embodiment 260, shown in FIG. 24, is that the extension of the layers 64 and 76 into the back region planarizes the construction of the head, making the manufacture of these layers, as well as the write coil layer 62 and the second coil layer 264, easier to construct in a uniform manner.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A low inductance magnetic write head, comprising:

first and second pole piece layers having pole tip ends separated by a write gap layer and back gap ends connected together at a back gap, the write head having a length that extends from said pole tip ends to said back gap ends;

a first insulation stack;

the insulation stack being sandwiched between the first and second pole piece layers;

first and second coil layers that are electrically connected in series;

each of the first and second coil layers having first and second layer portions;

the first layer portion of the first coil layer being embedded in said first insulation stack;

a non-magnetic separation layer;

the second pole piece layer being sandwiched between the first portion of the first coil layer and said separation layer, and the separation layer being sandwiched between the second pole piece layer and the first portion of the second coil layer;

the first layer portion of each of the first and second coil layers having a number of coil turn portions per length of the write head (turn density) traversing the second pole piece layer; and the first layer portion of the second coil layer having a turn density that is less than a turn density of the first layer portion of the first coil layer.

2. A magnetic write head as claimed in claim 1 wherein the second coil layer has a thickness that is greater than a thickness of the first coil layer.

3. A magnetic write head as claimed in claim 1, including:

the first pole piece layer having an extension which is located in a back region of the head that is back of the back gap in a direction away from said pole tip ends;

a second insulation stack on said extension;

the second portion of the first coil layer being embedded in said second insulation stack; and the second portion of the second coil layer being on the second portion of the first coil layer and separated therefrom by a portion of said second insulation stack.

4. A magnetic write head as claimed in claim 3, including:

a first shield layer having first and second portions; and the first portion of the first shield layer being located adjacent the first pole piece layer and the second portion of the first shield layer being located in said back region adjacent the extension of the first pole piece layer.

5. A magnetic write head as claimed in claim 1, including:

the second portions of the first and second coil layers being located in a back region of the head that is back of the back gap in a direction that is away from said insulation stack; and the second portion of the second coil layer having a turn density that is less than a turn density of the second portion of the first coil layer.

6. A magnetic write head as claimed in claim 1 wherein the turn density of the first portion of the second coil layer is 40%–70% of the turn density of the first portion of the first coil layer and the coil layers are connected so that current flows in opposite spiraling directions in the coil layers.

7. A low inductance magnetic write head, comprising:

first and second pole piece layers having pole tip ends separated by a write gap layer and back gap ends connected together at a back gap, the write head having a length that extends from said pole tip ends to said back gap ends;

a first insulation stack;

the insulation stack being sandwiched between the first and second pole piece layers;

first and second coil layers, each coil layer having inner and outer ends and coil turns that are wound in a common direction from the inner end to the outer end;

one of the inner or outer ends of the coil layers being electrically connected together and one of the outer or inner ends of the coil layers being adapted for connection to a write current source, respectively;

each of the first and second coil layers having first and second layer portions;

the first coil layer being wound about its inner end with its first layer portion embedded in said first insulation stack;

a non-magnetic separation layer;

the second pole piece layer being sandwiched between the first portion of the first coil layer and said separation layer, and the separation layer being sandwiched between the second pole piece layer and the first portion of the second coil layer;

the first layer portion of each of the first and second coil layers having a number of coil turn portions per length of the write head (turn density) traversing the second pole piece layer; and the first layer portion of the second coil layer having a turn density that is less than a turn density of the first layer portion of the first coil layer.

8. A magnetic write head as claim in claim 7 wherein the inner ends of the coil layers are connected together and the outer ends of the coil layers are adapted for receiving write current from the write current source.

9. A magnetic write head as claimed in claim 7 wherein the second coil layer has a thickness that is greater than a thickness of the first coil layer.

10. A magnetic write head as claimed in claim 7, including:

the first pole piece layer having an extension which is located in a back region of the head that is back of the back gap in a direction away from said pole tip ends;

a second insulation stack on said extension;

the second portion of the first coil layer being embedded in said second insulation stack; and the second portion of the second coil layer being on the second portion of the first coil layer and separated therefrom by a portion of said second insulation stack.

11. A magnetic write head as claimed in claim 10, including:

a first shield layer having first and second portions; and the first portion of the first shield layer being located adjacent the first pole piece layer and the second portion of the first shield layer being located in said back region adjacent the extension of the first pole piece layer.

12. A magnetic write head as claimed in claim 7, including:

the second portions of the first and second coil layers being located in a back region of the head that is back of the back gap in a direction that is away from said insulation stack; and the second portion of the second coil layer having a turn density that is less than a turn density of the second portion of the first coil layer.

13. A magnetic write head as claimed in claim 7 wherein the turn density of the first portion of the second coil layer is 40%–70% of the turn density of the first portion of the first coil layer and the coil layers are connected so that current flows in opposite spiraling directions in the coil layers.

14. A magnetic write head as claimed in claim 13 wherein the inner ends of the coil layers are connected together and the outer ends of the coil layers are adapted for receiving write current from the write current source.

15. A magnetic write head as claimed in claim 14 wherein the second coil layer has a thickness that is greater than a thickness of the first coil layer.

16. A magnetic write head as claimed in claim 15, including:

the first pole piece layer having an extension which is located in a back region of the head that is back of the back gap in a direction away from said pole tip ends;

a second insulation stack on said extension;

the second portion of the first coil layer being embedded in said second insulation stack; and the second portion of the second coil layer being on the second portion of the first coil layer and separated therefrom by a portion of said second insulation stack.

17. A magnetic write head as claimed in claim 16, including:

a first shield layer having first and second portions; and the first portion of the first shield layer being located adjacent the first pole piece layer and the second portion of the first shield layer being located in said back region adjacent the extension of the first pole piece layer.

18. A magnetic write head as claimed in claim 17, including:

the second portions of the first and second coil layers being located in a back region of the head that is back of the back gap in a direction that is away from said first insulation stack; and the second portion of the second coil layer having a turn density that is less than a turn density of the second portion of the first coil layer.

19. A magnetic head having an air bearing surface (ABS), comprising:

first and second pole piece layers, each pole piece layer having a front pole tip portion that terminates at the ABS, a back gap portion recessed from the ABS and a yoke portion between the pole tip and back gap portions, the magnetic head having a length from the ABS to the back gap portions;

a non-magnetic write gap layer;

the pole tip portion of the first and second pole piece layers being separated at the ABS by the write gap layer and the back gap portions being connected;

first and second pancake coil layers that are a part of a write coil circuit, each coil layer having a front portion, a back portion and first and second ends;

the front portion of the first coil layer being located in a space between the yoke portions of the first and second pole piece layers and the yoke portion of the second pole piece layer being located between the front portions of the first and second coil layers;

the first ends of the coil layers being connected together and the second ends of the coil layers being adapted for connection to a write current source so that a write current can be conducted in series through the coil layers, the write current causing each of the coil layers to generate flux;

the coil layers being arranged for flux opposition outside the first and second pole piece layers;

the first layer portion of each of the first and second coil layers having a number of coil turn portions per length (turn density) traversing the second pole piece layer; and the coil turn density of the front portion of the second coil layer being less than the coil turn density of the front portion of the first coil layer.

20. A magnetic head as claimed in claim 19 wherein the second coil layer has a thickness that is greater than a thickness of the first coil layer.

21. A magnetic head as claimed in claim 19, including:

the back portion of each coil layer having a turn density that is less than the coil turn density of the front portion of the coil layer; and the coil turn density of the back portion of the second coil layer being less than the coil turn density of the back portion of the first coil layer.

22. A magnetic head as claimed in claim 19 wherein the coil turn density of the front portion of the second coil layer is 40%–70% of the coil turn density of the front portion of the first coil layer.

23. A magnetic head as claimed in claim 19, including:

the first pole piece layer having a back portion which extends from the back gap portion of the first pole piece layer rearwardly away from the ABS;

the back portions of the first and second coil layers being located on top of the back portion of the first pole piece layer.

24. A magnetic head as claimed in claim 23, including:

a first shield layer underlying the pole tip portion, yoke portion, back gap portion and back portion of the first pole piece layer.

25. A magnetic head as claimed in claim 19 wherein the front portion of the second coil layer is located on top of the front portion of the first coil layer.

26. A magnetic head as claimed in claim 19 wherein the front portion of the second coil layer is located on top of the front portion of the first coil layer and on top of the back gap portion of the second pole piece.

27. A magnetic head as claimed in claim 19 wherein the first and second coil layers spiral in the same direction from their first ends to their second ends;

the coil layers are connected so that current flows in opposite spiraling directions in the coil layers;

each coil layer has its first end located in a center portion thereof;

the yoke portion of the second pole piece layer having top and bottom surfaces; and an insulation layer between the front portion of the first coil layer and the bottom surface of the second pole piece layer and a non-magnetic separation layer between the top surface of the second pole piece layer and the front portion of the second coil layer.

28. A magnetic head as claimed in claim 27 wherein the second coil layer has a thickness that is greater than a thickness of the first coil layer.

29. A magnetic head as claimed in claim 28, including:

the back portion of each coil layer having a coil turn density that is less than the coil turn density of the front portion of the coil layer; and the back portion of the second coil layer being less than the coil turn density of the back portion of the first coil layer.

30. A magnetic head as claimed in claim 29 wherein the coil turn density of the front portion of the second coil layer is 40%–70% of the coil turn density of the front portion of the first coil layer.

31. A magnetic head as claimed in claim 30, including:

the first pole piece layer having a back portion which extends from the back gap portion of the first pole piece layer rearwardly away from the ABS;

the back portions of the first and second coil layers being located on top of the back portion of the first pole piece layer.

32. A magnetic head as claimed in claim 31, including:

a first shield layer underlying the pole tip portion, yoke portion, back gap portion and back portion of the first pole piece layer.

33. A magnetic head as claimed in claim 32 wherein the front portion of the second coil layer is located on top of the front portion of the first coil layer.

34. A magnetic head as claimed in claim 32 wherein the front portion of the second coil layer is located on top of the front portion of the first coil layer and on top of the back gap portion of the second pole piece.

35. A combined magnetic head, comprising: a write head, including:

first and second pole piece layers having pole tip ends separated by a write gap layer and back gap ends connected together at a back gap, the write head having a length that extends from said pole tip ends to said back gap ends;

a first insulation stack;

the insulation stack being sandwiched between the first and second pole piece layers;

first and second coil layers, each coil layer having inner and outer ends and coil turns that are wound in a common direction from the inner end to the outer end;

one of the inner or outer ends of the coil layers being electrically connected together and one of the outer or inner ends of the coil layers being adapted for connection to a write current source, respectively;

each of the first and second coil layers having first and second layer portions;

the first coil layer being wound about its inner end with its first layer portion embedded in said first insulation stack;

a non-magnetic separation layer;

the second pole piece layer being sandwiched between the first portion of the first coil layer and said separation layer, and the separation layer being sandwiched between the second pole piece layer and the first portion of the second coil layer;

the first layer portion of each of the first and second coil layers having a number of coil turn portions per length of the write head (turn density) traversing the second pole piece layer; and the first layer portion of the second coil layer having a turn density that is less than a turn density of the first layer portion of the first coil layer; a read head including:

an MR sensor, first and second gap layers and first and second shield layers;

the MR sensor being sandwiched between the first and second gap layers and the first and second gap layers being sandwiched between the first and second shield layers; and the second shield layer being a common layer with said first pole piece layer; and sense current source means for providing a sense current to the sensor.

36. A combined magnetic head as claimed in claim 35 wherein the turn density of the first portion of the second coil layer is 40%–70% of the turn density of the first portion of the first coil layer and the coil layers are connected so that current flows in opposite spiraling directions in the coil layers.

37. A combined magnetic head as claimed in claim 36 wherein the inner ends of the coil layers are connected together and the outer ends of the coil layers are adapted for receiving write current from the write current source.

38. A combined magnetic head as claimed in claim 37 wherein the second coil layer has a thickness that is greater than a thickness of the first coil layer.

39. A combined magnetic head as claimed in claim 38, including:

the first pole piece layer having an extension which is located in a back region of the write head that is back of the back gap in a direction away from said pole tip ends;

a second insulation stack on said extension;

the second portion of the first coil layer being embedded in said second insulation stack; and the second portion of the second coil layer being on the second portion of the first coil layer and separated therefrom by a portion of said second insulation stack.

40. A combined magnetic head as claimed in claim 39, including:

a first shield layer having first and second portions; and the first portion of the first shield layer being located adjacent the first pole piece layer and the second portion of the first shield layer being located in said back region adjacent the extension of the first pole piece layer.

41. A combined magnetic head as claimed in claim 40, including:

the second portions of the first and second coil layers being located in a back region of the write head that is back of the back gap in a direction that is away from said first insulation stack; and the second portion of the second coil layer having a turn density that is less than a turn density of the second portion of the first coil layer.

42. A magnetic disk drive, comprising:

a write head, including:

first and second pole piece layers having pole tip ends separated by a write gap layer and back gap ends connected together at a back gap, the write head having a length that extends from said pole tip ends to said back gap ends;

a first insulation stack;

the first insulation stack being sandwiched between the first and second pole piece layers;

first and second coil layers, each coil layer having inner and outer ends and coil turns that are wound in a common direction from the inner end to the outer end;

one of the inner or outer ends of the coil layers being electrically connected together and one of the outer or inner ends of the coil layers being adapted for connection to a write current source, respectively;

each of the first and second coil layers having first and second layer portions;

the first coil layer being wound about its inner end with its first layer portion embedded in said insulation stack;

a non-magnetic separation layer;

the second pole piece layer being sandwiched between the first portion of the first coil layer and said separation layer and the separation layer being sandwiched between the second pole piece layer and the first portion of the second coil layer;

the first layer portion of each of the first and second coil layers having a number of coil turn portions per length of the write head (turn density) traversing the second pole piece layer; and the first layer portion of the second coil layer having a turn density that is less than a turn density of the first layer portion of the first coil layer; a read head including:

an MR sensor, first and second MR sensor leads, first and second gap layers and first and second shield layers;

the MR sensor and the first and second MR sensor leads being sandwiched between the first and second gap layers and the first and second gap layers being sandwiched between the first and second shield layers; and the second shield layer and said first pole piece layer being a common layer;

sense current source means for applying a sense current through the sensor;

the write head and the read head forming a combined magnetic head; a frame;

a magnetic disk rotatably supported on the frame;

a support mounted on the frame for supporting the combined magnetic head in a transducing relationship with the magnetic disk;

means for rotating the magnetic disk;

positioning means connected to the support for moving the combined magnetic head to multiple positions with respect to said magnetic disk; and means connected to the combined magnetic head, to the means for rotating the magnetic disk and to the positioning means for exchanging signals with the combined magnetic head, for controlling movement of the magnetic disk and for controlling the position of the combined magnetic head.

43. A magnetic disk drive as claimed in claim 42 wherein the turn density of the first portion of the second coil layer is 40%–70% of the turn density of the first portion of the first coil layer and the coil layers are connected so that current flows in opposite spiraling directions in the coil layers.

44. A magnetic disk drive as claimed in claim 43 wherein the inner ends of the coil layers are connected together and the outer ends of the coil layers are adapted for receiving write current from the write current source.

45. A magnetic disk drive as claimed in claim 44 wherein the second coil layer has a thickness that is greater than a thickness of the first coil layer.

46. A magnetic disk drive as claimed in claim 45, including:
the first pole piece layer having an extension which is located in a back region of the write head that is back of the back gap in a direction away from said pole tip ends;
a second insulation stack on said extension;
the second portion of the first coil layer being embedded in said second insulation stack; and
the second portion of the second coil layer being on the second portion of the first coil layer and separated therefrom by a portion of said second insulation stack.

47. A magnetic disk drive as claimed in claim 46, including:
the first shield layer having first and second portions; and
the first portion of the first shield layer being located adjacent the first pole piece layer and the second portion of the first shield layer being located in said back region adjacent the extension of the first pole piece layer.

48. A magnetic disk drive as claimed in claim 47, including:
the second portions of the first and second coil layers being located in a back region of the write head that is back of the back gap in a direction that is away from said first insulation stack; and
the second portion of the second coil layer having a turn density that is less than a turn density of the second portion of the first coil layer.

49. A method of making a low inductance magnetic write head comprising the unordered steps of:
forming a first pole piece layer;
forming a first insulation layer on the first pole piece layer;
forming a first coil layer that has inner and outer ends, coil turns that are wound about the inner end to the outer end and first and second layer portions, the first layer portion being located on the first insulation layer;
forming at least a second insulation layer on the first portion of the first coil layer;
forming a second pole piece layer on the second insulation layer;
forming a non-magnetic separation layer on the second pole piece layer;
forming a second coil layer that has inner and outer ends, coil turns that are wound about the inner end to the outer end and first and second layer portions, the first layer portion being located on said separation layer;
the coil turns of the first and second coil layers being wound in a common direction from the inner ends to the outer ends;
electrically connecting one of the inner and outer ends of the coil layers together and adapting one of the outer or inner ends of the coil layers for connection to a write current source respectively; and
making the first layer portion of the second coil layer with a turn density that is less than a turn density of the first layer portion of the first coil layer.

50. A method as claimed in claim 49 for connecting the inner ends of the coil layers together and adapting the outer ends of the coil layers for receiving write current from the write current source.

51. A method as claimed in claim 49 providing the second coil layer with a thickness that is greater than a thickness of the first coil layer.

52. A method as claimed in claim 49, including:
providing the first pole piece layer with an extension which is located in a back region of the head that is back of a back gap in a direction away from pole tip ends;
providing an insulation stack on said extension;
embedding the second portion of the first coil layer in said insulation stack; and
positioning the second portion of the second coil layer on the second portion of the first coil layer and separated therefrom by a portion of said insulation stack.

53. A method as claimed in claim 52, including:
providing a first shield layer with first and second portions; and
locating the first portion of the first shield layer adjacent the first pole piece layer and the second portion of the first shield layer in said back region adjacent the extension of the first pole piece layer.

54. A method as claimed in claim 49, including:
locating the second portions of the first and second coil layers in a back region of the head that is back of a back gap in a direction that is away from said insulation layers; and
providing the second portion of the second coil layer with a turn density that is less than a turn density of the second portion of the first coil layer.

55. A method as claimed in claim 49 wherein the turn density of the first portion of the second coil layer is 40%–70% of the turn density of the first portion of the first coil layer and connecting the coil layers so that current flows in opposite spiraling directions in the coil layers.

56. A method as claimed in claim 55 for connecting the inner ends of the coil layers together and adapting the second ends of the coil layers for receiving write current from the write current source.

57. A method as claimed in claim 56 providing the second coil layer with a thickness that is greater than a thickness of the first coil layer.

58. A method as claimed in claim 57, including:
providing the first pole piece layer with an extension which is located in a back region of the head that is back of a back gap in a direction away from pole tip ends;
providing an insulation stack on said extension;
embedding the second portion of the first coil layer in said insulation stack; and
positioning the second portion of the second coil layer on the second portion of the first coil layer and separated therefrom by a portion of said insulation stack.

59. A method as claimed in claim 58, including:
providing a first shield layer with first and second portions; and
positioning the first portion of the first shield layer adjacent the first pole piece layer and the second portion of the first shield layer in said back region adjacent the extension of the first pole piece layer.

60. A method as claimed in claim 59, including:

positioning the second portions of the first and second coil layers in a back region of the head that is back of a back gap in a direction that is away from said insulation layers; and providing the second portion of the second coil layer with a turn density that is less than a turn density of the second portion of the first coil layer.

* * * * *